(12) United States Patent
Shimada

(10) Patent No.: US 6,693,945 B1
(45) Date of Patent: Feb. 17, 2004

(54) SCANNING TYPE LASER MICROSCOPE

(75) Inventor: Yoshihiro Shimada, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/663,631

(22) Filed: Sep. 18, 2000

(30) Foreign Application Priority Data

Sep. 20, 1999 (JP) .......................................... 11-265326

(51) Int. Cl.$^7$ .................................................. H01S 3/08
(52) U.S. Cl. ............................ 372/98; 372/22; 385/31
(58) Field of Search .............................. 372/22, 21, 25, 372/26, 29.01; 385/31; 354/389, 368, 385, 497, 450; 250/201.3, 306

(56) References Cited

U.S. PATENT DOCUMENTS

| | | | | |
|---|---|---|---|---|
| 5,034,613 A | * | 7/1991 | Denk | 250/458.1 |
| 5,289,479 A | * | 2/1994 | Oka | 372/22 |
| 5,473,409 A | * | 12/1995 | Takeda et al. | 355/53 |
| 5,804,813 A | * | 9/1998 | Wang et al. | 250/201.3 |
| 5,862,287 A | * | 1/1999 | Stock | 385/123 |
| 5,903,688 A | * | 5/1999 | Engelhardt et al. | 385/31 |
| 5,910,963 A | * | 6/1999 | Simon | 372/98 |
| 5,946,090 A | * | 8/1999 | Tashiro et al. | 356/326 |
| 6,232,588 B1 | * | 5/2001 | Naya | 250/208.1 |
| 6,282,020 B1 | | 8/2001 | Ogino | |

FOREIGN PATENT DOCUMENTS

WO     WO 96/06377     2/1996

* cited by examiner

*Primary Examiner*—Paul Ip
*Assistant Examiner*—Tuan Nguyen
(74) *Attorney, Agent, or Firm*—Frishauf, Holtz, Goodman & Chick, P.C.

(57) ABSTRACT

This invention provides a laser scanning microscope in which a harmonic generator for modulating a laser beam Q having passed through an optical fiber into a laser beam Qb having a wavelength different from that of the laser beam Q, and sending the laser beam Qb to a scanning type optical microscope main body is integrally attached to the scanning type optical microscope main body.

8 Claims, 3 Drawing Sheets

SCANNING TYPE LASER MICROSCOPE

CROSS-REFERENCE TO RELATED APPLICATIONS

This application is based upon and claims the benefit of priority from the prior Japanese Patent Application No. 11-265326, filed Sep. 20, 1999, the entire contents of which are incorporated by reference.

BACKGROUND OF THE INVENTION

The present invention relates to a laser scanning microscope for transmitting a laser beam in the ultraviolet (UV) range output from, e.g., a laser source via an optical fiber, and detecting light from a specimen upon scanning it with the laser beam via an objective lens, thereby obtaining an observation image.

Such laser scanning microscopes are used mainly as inspection apparatuses in the industrial field, and are widely used as research observation apparatuses in the medical and biological fields. Inspection apparatuses in the industrial field are strongly required to have increased optical resolving power. The wavelength of a light source is shifting from the visible range to the UV range having a shorter wavelength. In research observation apparatuses in the medical and biological fields, a fluorochrome such as DAPI is used to observe fluorescence from a specimen by irradiating the specimen with a UV light. As the light source, a combination with a UV light is strongly demanded.

In this manner, light in the UV range is being used in the industrial field and the medical and biological fields. In general, the laser source of a UV laser beam is large. Vibrations are generated by a cooling fan and circulation of cooling water, and propagate to a laser scanning microscope main body to adversely influence the main body. Thus, the laser scanning microscope cannot exhibit sufficient stability.

To solve this problem, PCT WO 96/06377 discloses a technique of removing the influence of vibrations and heat generation from a UV laser source by coupling the UV laser source and a microscope main body (containing a scanning device) with an optical fiber.

However, as described in detail in PCT WO 96/06377 as well, when a UV laser beam enters the optical fiber, the exit light quantity from the optical fiber decreases within a short time owing to photochemical reaction, and does not recover.

To prevent this, PCT WO 96/06377 adopts a shutter between a UV laser beam and an optical fiber in order to minimize the decrease in the quantity of exit light from the optical fiber. This shutter allows the UV laser beam to enter the optical fiber only while a specimen is scanned with the UV laser beam or during the image sensing operation.

However, the purpose of the technique disclosed in PCT WO 96/06377 is to prevent an unwanted UV laser beam from entering the optical fiber, and the technique does not fundamentally solve degradation of the optical fiber by photochemical reaction caused by the UV laser beam. If a specimen is kept scanned to sense its image by emitting the UV laser beam toward the optical fiber and transmitting it to the laser scanning microscope, photochemical reaction inevitably proceeds to decrease the exit light quantity from the optical fiber.

BRIEF SUMMARY OF THE INVENTION

It is an object of the present invention to provide a compact laser scanning microscope having stable performance and a high optical resolving power without varying the light quantity of a UV laser beam to a specimen.

According to the first aspect of the present invention, a laser scanning microscope for scanning a specimen with a laser beam having passed through an optical fiber, and obtaining an observation image of the specimen on the basis of light from the specimen comprises a laser source for emitting a laser beam having a first wavelength, an optical fiber for transmitting the laser beam having the first wavelength from the laser source to a microscope main body, and laser modulation means for modulating the laser beam having the first wavelength that has passed through the optical fiber into a laser beam having a second wavelength shorter than the first wavelength.

According to this aspect, the wavelength of a laser beam which passes through the optical fiber can be set longer than that of a laser beam which irradiates a specimen. When, for example, the specimen is to be irradiated with a UV light, the UV light need not pass through the optical fiber. This can prevent a decrease in exit light quantity caused by photochemical reaction in the optical fiber.

According to the second aspect of the present invention, the laser modulation means in the first aspect modulates the first wavelength into a second wavelength serving as a 2nd or higher harmonic.

According to the third aspect, the laser scanning microscope in the first aspect further comprises an optical system for scanning the specimen with at least one of the laser beam having the first wavelength that has passed through the optical fiber, and the laser beam having the second wavelength that is modulated by the laser modulation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Figure 1:
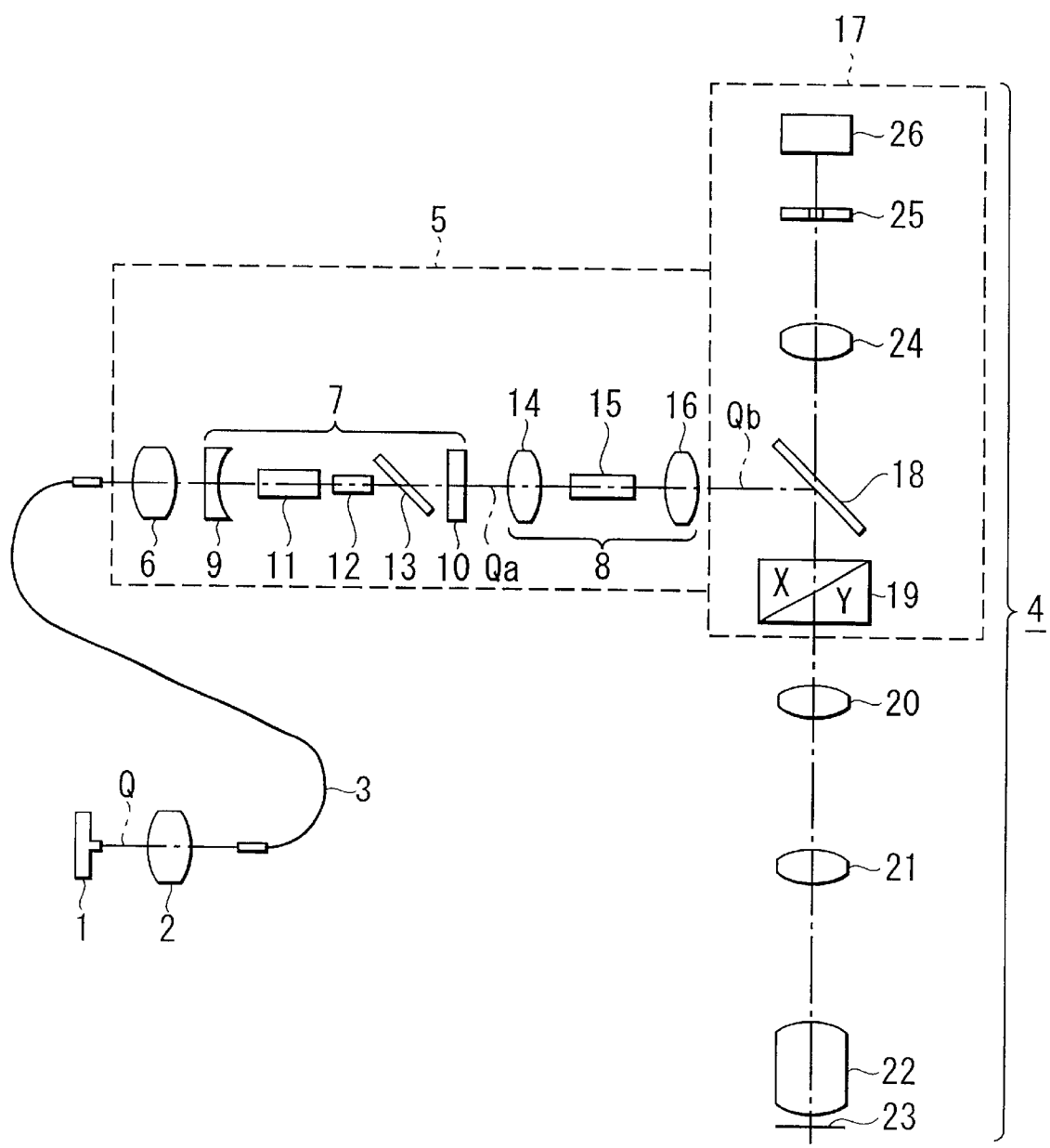
FIG. 1 is a view showing a confocal laser scanning microscope applied to a research observation apparatus in the medical and biological fields according to the first embodiment of the present invention.

DETAILED DESCRIPTION OF THE INVENTION (1) The first embodiment of the present invention will be described with reference to the drawing.

FIG. 1 is a view showing the arrangement of a confocal laser scanning microscope used as a research observation apparatus in the medical and biological fields.

A semiconductor laser source 1 emits a laser beam Q having a wavelength of about 800 nm. An optical fiber 3 is inserted in the exit optical path of the semiconductor laser source 1 via a collector lens 2. The optical fiber 3 is formed from a fiber which conserves the polarization plane, and connected to a harmonic generator 5 attached to a scanning type optical microscope main body 4. The harmonic generator 5 is attached to the scanning type optical microscope main body 4 with a fastening member such as a bolt.

The harmonic generator 5 modulates the laser beam Q having passed through the optical fiber 3 into a laser beam Qb having a different wavelength from that of the laser beam Q, and sends the laser beam Qb to the scanning type optical microscope main body 4. The harmonic generator 5 is made up of a lens 6, resonator 7, and harmonic generation optical system 8.

The resonator 7 is constituted by arranging an ND:YAG crystal 11 and optical elements 12 and 13 between a pair of resonator mirrors 9 and 10. By exciting the ND:YAG crystal 11, the resonator 7 oscillates a laser beam Qa having a wavelength of 1,064 nm.

The harmonic generation optical system 8 is comprised of a condenser lens 14, crystal 15 for generating a 3rd harmonic, and collimator lens 16. The harmonic generation optical system 8 modulates the laser beam Qa from the resonator 7 into a laser beam Qb having a wavelength of about 355 nm.

The scanning type optical microscope main body 4 comprises a scanning device 17. The laser beam Qb emerging from the harmonic generator 5 is incident on a dichroic mirror 18 incorporated in the scanning device 17. An XY scanner 19, pupil projection lens 20, imaging lens 21, and objective lens 22 are inserted in the reflection optical path of the dichroic mirror 18. A specimen 23 is placed at the focused position of the laser beam Qb emerging from the objective lens 22.

A confocal lens 24, pinhole 25, and photodetector 26 are inserted in the optical path of light, e.g., fluorescence or reflected light from the specimen 23 via the objective lens 22, imaging lens 21, pupil projection lens 20, XY scanner 19, and dichroic mirror 18 that share the incident optical path. Of these components, the dichroic mirror 18 reflects the laser beam Qb emerging from the harmonic generator 5, and transmits the fluorescence from the specimen 23. The pinhole 25 is arranged at the focal position of the confocal lens 24.

The operation of the laser scanning microscope having this arrangement will be explained.

When a laser beam Q having a wavelength of about 800 nm is emitted by the semiconductor laser source 1, the laser beam Q enters the optical fiber 3 via the collector lens 2, and propagates through the optical fiber 3 to reach the harmonic generator 5.

The laser beam Q enters the resonator 7 via the lens 6 to excite the Nd:YAG crystal 11. Excitation of the Nd:YAG crystal 11 generates optical resonance in the resonator 7 to emit a laser beam Qa having a wavelength of 1,064 nm, which enters the harmonic generation optical system 8.

When the laser beam Qa enters the harmonic generation optical system 8, and passes through the crystal 15 via the condenser lens 14, it is modulated into a laser beam Qb having the 3rd harmonic of the incident wavelength, e.g., a wavelength of about 355 nm. Then, the laser beam Qb emerges from the collimator lens 16.

The laser beam Qb modulated into the 3rd harmonic is reflected by the dichroic mirror 18, and sent to the XY scanner 19 to scan the XY plane by the XY scanner 19. The scanned laser beam Qb emerges from the objective lens 22 via the pupil projection lens 20 and imaging lens 21 to irradiate the specimen 23.

Fluorescence or reflected light from the specimen 23 travels back through an optical path opposite to the optical path for irradiating the specimen 23 with the laser beam Qb, and returns from the objective lens 22 to the imaging lens 21, pupil projection lens 20, and XY scanner 19. Only the fluorescence passes through the dichroic mirror 18, and enters the photodetector 26 via the confocal lens 24 and pinhole 25.

Consequently, the fluorescent image of the specimen 23 is obtained based on an electrical signal output from the photodetector 26.

In the first embodiment, the laser beam Q having a wavelength of 800 nm enters the optical fiber 3 without passing any UV light through the optical fiber 3. The laser beam Q having passed through the optical fiber 3 is modulated into a laser beam Qb having a wavelength of 355 nm different from a wavelength of 800 nm for the laser beam Q, and the specimen 23 is scanned with the laser beam Qb. Accordingly, stable performance with small size and a high resolving power can be attained without varying the light quantity of the laser beam Qb to the specimen 23.

More specifically, the conversion efficiency to the laser beam Qb having a wavelength of about 355 nm which is excited by the laser beam Q from the semiconductor laser source 1 and finally emerges from the harmonic generator 5 is generally low. To obtain the light quantity of the laser beam Qb having a wavelength of about 355 nm that is necessary to detect weak fluorescence from the specimen 23, a laser output from the semiconductor laser source 1 must be increased. The increase in laser output from the semiconductor laser source 1 inevitably generates heat, which requires a water cooling device, cooling fan, or the like.

To the contrary, according to the first embodiment, the semiconductor laser source 1 and scanning type optical microscope main body 2 are separately arranged via the optical fiber 3. This can remove the influence of vibrations or heat generated by the water cooling device, cooling fan, or the like arranged in the semiconductor laser source 1.

In addition, the resonator 7 having the ND:YAG crystal 10 and the harmonic generation optical system 8 constitute the harmonic generator 5 as one block, which can facilitate assembly and adjustment and can reduce the cost.

The harmonic generator 5 is attached to the scanning type optical microscope main body 4 with a fastening member such as a bolt, and thus is excellent in maintenance performance.

Since the optical fiber 3 is formed from a fiber which conserves the polarization plane, the harmonic generation efficiency by the harmonic generator 5 can be increased.

In this embodiment, the optical fiber 3 is laid between the semiconductor laser source 1 and the resonator 7, but is not limited to this. For example, the semiconductor laser source 1 and resonator 7 may be integrated, and an optical fiber for guiding the laser beam Qb from the resonator 7 to the harmonic generation optical system 8 may be used. This can downsize the scanning type optical microscope main body 4 itself.

(2) The second embodiment of the present invention will be described with reference to the drawing. Note that the same reference numerals as in FIG. 1 denote the same parts, and a detailed description thereof will be omitted.

Figure 2:
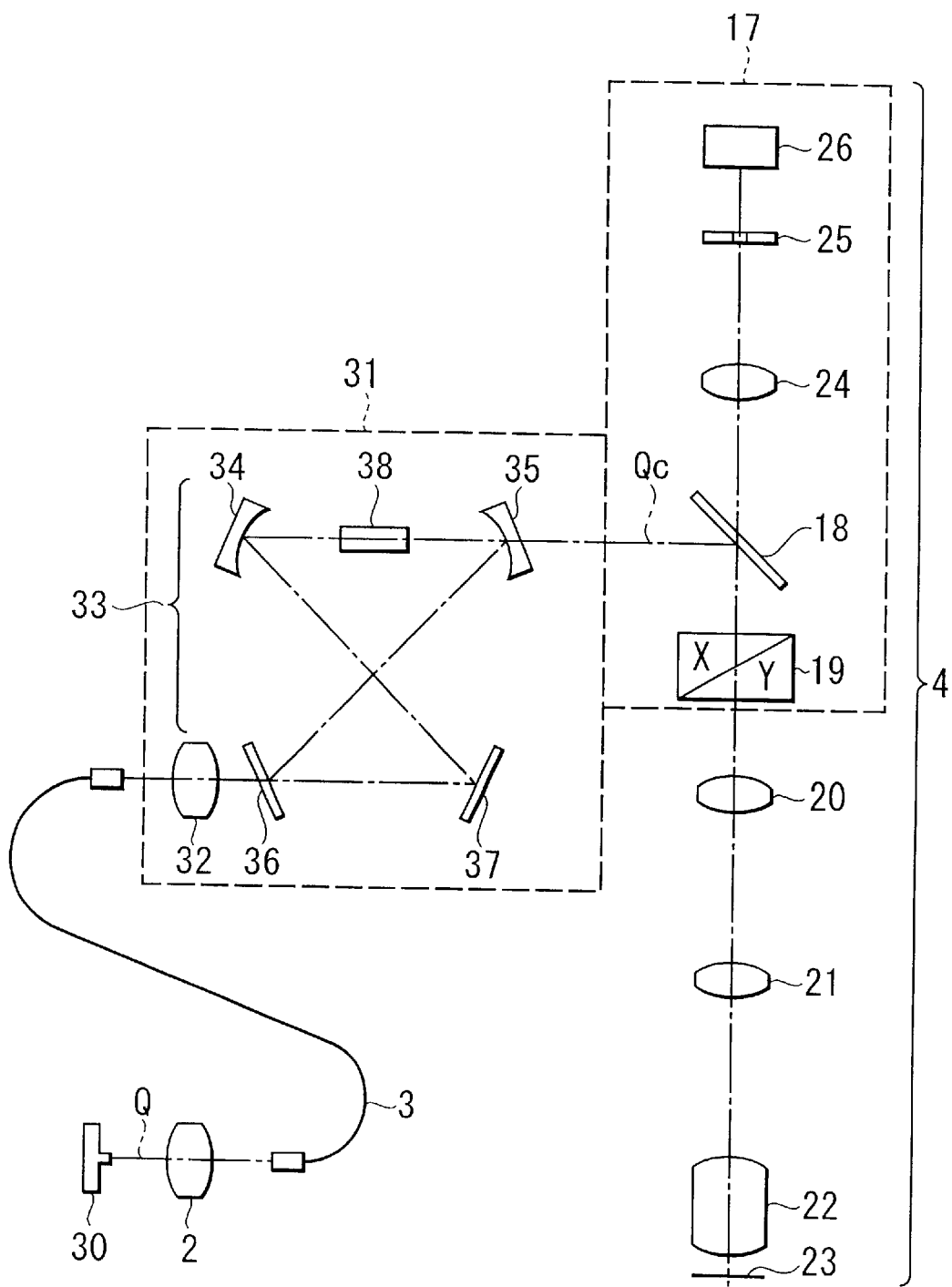
FIG. 2 is a view showing a confocal laser scanning microscope used mainly as an inspection apparatus in the industrial field according to the second embodiment of the present invention.

FIG. 2 is a view showing the arrangement of a confocal laser scanning microscope used mainly as an inspection apparatus in the industrial field.

A solid-state laser device 30 emits a laser beam Q having a wavelength of 532 nm. The laser beam Q enters an optical fiber 3 via a collector lens 2. The optical fiber 3 is connected to a harmonic generator 31 attached to a scanning type optical microscope main body 4. The harmonic generator 31 is attached to the scanning type optical microscope main body 4 with a fastening member such as a bolt.

The harmonic generator 31 modulates the laser beam Q having passed through the optical fiber 3 into a laser beam Qc (UV light) having a wavelength of 266 nm different from a wavelength of 532 nm for the laser beam Q, and sends the laser beam Qc to the scanning type optical microscope main body 4. The harmonic generator 31 is made up of a collimator lens 32 and resonator 33.

The resonator 33 has resonator mirrors 34, 35, 36, and 37. A crystal 38, e.g., KNbO$_3$ (potassium niobate) for generating a 2nd harmonic (wavelength: 266 nm) is interposed between the resonator mirrors 34 and 35.

The operation of the laser scanning microscope having this arrangement will be explained.

When a laser beam Q having a wavelength of about 532 nm is emitted by the solid-state laser source 30, the laser beam Q enters the optical fiber 3 via the collector lens 2, and propagates through the optical fiber 3 to reach the harmonic generator 31.

The laser beam Q is converted into a collimated beam by the collimator lens 32, and enters the resonator 33. In the resonator 33, optical resonance is generated by the resonator mirrors 34, 35, 36, and 37. The beam passes through the crystal 38 of, e.g., KNbO$_3$ (potassium niobate), and is modulated into a laser beam Qc (UV light) having a wavelength of 266 nm as a 2nd harmonic.

The laser beam Qc modulated into the 2nd harmonic is reflected by a beam splitter 18, and sent to an XY scanner 19 to scan the XY plane by the XY scanner 19. The scanned laser beam Qc emerges from an objective lens 22 via a pupil projection lens 20 and imaging lens 21 to irradiate a specimen 23.

Light reflected by the specimen 23 travels back through an optical path opposite to the optical path for irradiating the specimen 23 with the laser beam Qc, and passes from the objective lens 22 through the imaging lens 21, pupil projection lens 20, XY scanner 19, and beam splitter 18. The laser beam Qc enters a photodetector 26 via a confocal lens 24 and pinhole 25.

The reflection image of the specimen 23 is obtained based on an electrical signal output from the photodetector 26.

In the second embodiment, the laser beam Q having passed through the optical fiber 3 is modulated into a laser beam Qc having a wavelength of 266 nm different from a wavelength of 532 nm for the laser beam Q, and the specimen 23 is scanned with the laser beam Qc. Therefore, the second embodiment can attain the same effects as those of the first embodiment.

Recently, inspection apparatuses in the industrial field are strongly required to increase the optical resolving power, and the light source is shifting from the visible light range to the ultraviolet range having a shorter wavelength. To meet this demand, light having a wavelength as very short as 266 nm is irradiated to realize a high resolving power, like the second embodiment.

(3) The third embodiment of the present invention will be described with reference to the drawing. Note that the same reference numerals as in FIG. 1 denote the same parts, and a detailed description thereof will be omitted.

Figure 3:
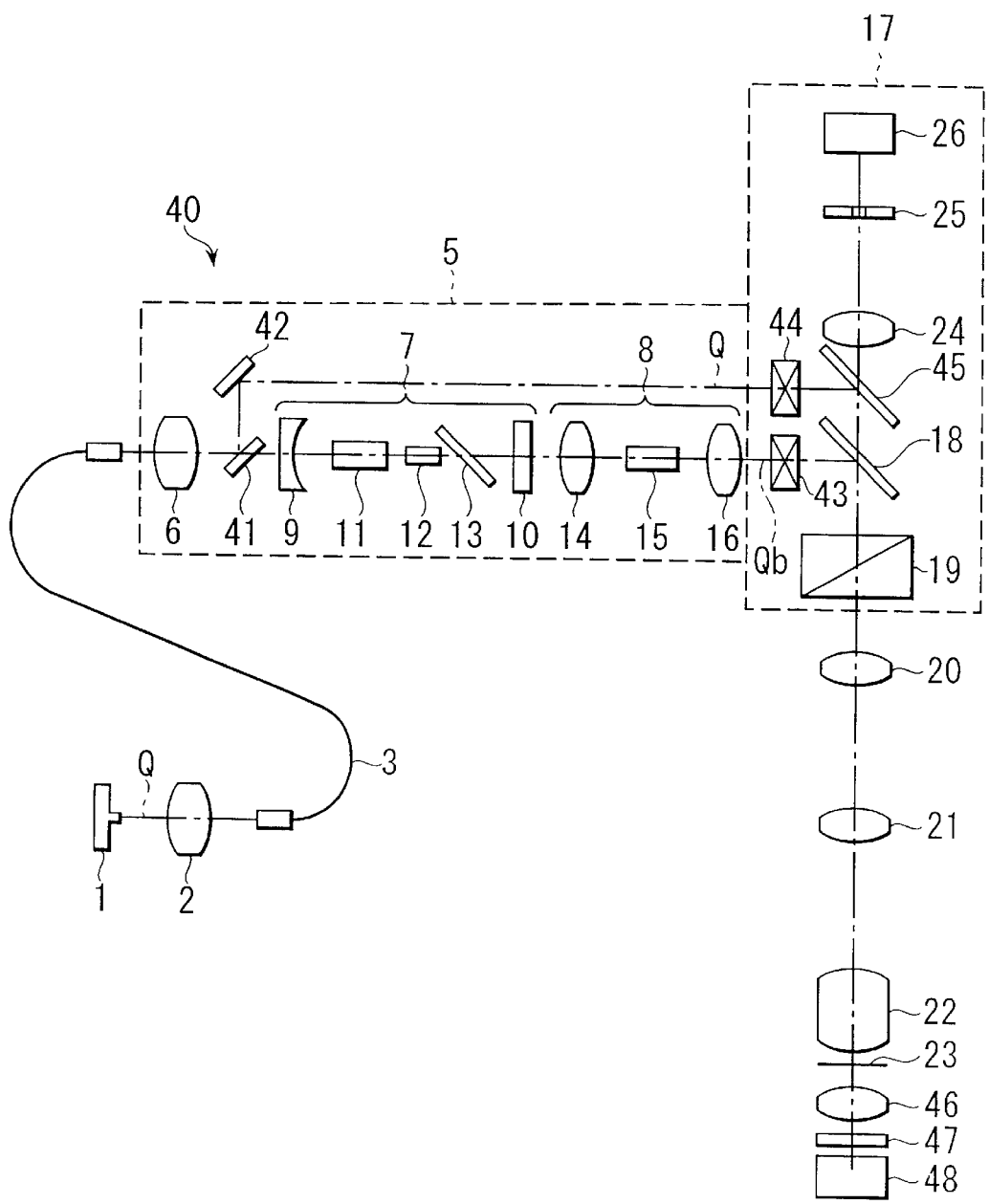
FIG. 3 is a view showing a confocal laser scanning microscope used as a research observation apparatus in the medical and biological fields according to the third embodiment of the present invention.

FIG. 3 is a view showing the arrangement of a confocal laser scanning microscope used as a research observation apparatus in the medical and biological fields.

This confocal laser scanning microscope comprises an optical path split system 40 for simultaneously or selectively scanning a specimen 23 with a laser beam Q having passed through an optical fiber 3 and a laser beam Qb modulated by a harmonic generation optical system 8.

In the optical path split system 40, a beam splitter 41 is interposed between a lens 6 and a resonator 7, and a mirror 42 is inserted in the split optical path of the beam splitter 41. A shutter 43 is inserted in the optical path of the harmonic generation optical system 8 extending from a resonator 7 in a harmonic generator 5, while a shutter 44 is inserted in the reflection optical path of the mirror 42. These shutters 43 and 44 operate to simultaneously or selectively irradiate the specimen 23 with the laser beam Q from the optical fiber 3 and the laser beam Qb modulated by the harmonic generation optical system 8.

The shutters 43 and 44 may be switched by the user with, e.g., a mechanical switch, or may be switched by a computer program.

A dichroic mirror 45 is arranged at the intersection with the optical path of a scanning device 17 on an optical path extending from the mirror 42 to the shutter 44. The dichroic mirror 45 has a spectral characteristic of reflecting light having a wavelength of 800 nm, and transmitting light having a shorter wavelength.

A condenser lens 46, bandpass filter 47 for transmitting only light having a wavelength of 800 nm, and photodetector 48 are inserted in the transmission optical path of the specimen 23.

The operation of the laser scanning microscope having this arrangement will be explained.

When a laser beam Q having a wavelength of about 800 nm is emitted by a semiconductor laser source 1, the laser beam Q enters the optical fiber 3 via a collector lens 2, and propagates through the optical fiber 3 to reach the harmonic generator 5.

The beam splitter 41 transmits the laser beam Q, and reflects part of it. The laser beam Q having passed through the beam splitter 41 enters the resonator 7 where an Nd:YAG crystal 11 is excited to generate optical resonance. Light having a wavelength of 1,064 nm is emitted to enter the harmonic generation optical system 8. In the harmonic generation optical system 8, when the light passes through a crystal 15 via a condenser lens 14, the light is modulated into a laser beam Qb having the 3rd harmonic of the incident wavelength, i.e., a wavelength of about 355 nm. The laser beam Qb emerges from the collimator lens 16.

At this time, when the shutter 43 is open, and the shutter 44 is closed, the modulated laser beam Qb is reflected by a dichroic mirror 18 via the shutter 43, and sent to an XY scanner 19 to scan the XY plane by the XY scanner 19. The scanned laser beam Qa emerges from an objective lens 22 via a pupil projection lens 20, and imaging lens 21 to irradiate a specimen 23.

Fluorescence or reflected light from the specimen 23 travels back through an optical path opposite to the optical path for irradiating the specimen 23 with the laser beam Qb, and returns from the objective lens 22 to the imaging lens 21, pupil projection lens 20, and XY scanner 19. Only the fluorescence passes through the dichroic mirrors 18 and 45, and enters a photodetector 26 via a confocal lens 24 and pinhole 25. The fluorescent image of the specimen 23 is obtained based on an electrical signal output from the photodetector 26.

On the other hand, when the shutter 43 is closed, and the shutter 44 is open, the laser beam Q having a wavelength of about 800 nm that has been reflected by the beam splitter 41 is reflected by the mirror 42, passes through the shutter 44, and travels through the dichroic mirrors 45 and 18 to scan the XY plane by the XY scanner 19. Then, the laser beam Q emerges from the objective lens 22 via the pupil projection lens 20 and imaging lens 21 to irradiate the specimen 23.

The light having passed through the specimen 23 passes from the condenser lens 46 through the bandpass filter 47 to enter the photodetector 48. The transmission image of the specimen 23 is obtained based on an electrical signal output from the photodetector 48.

When both the shutters 43 and 44 are open, the fluorescence image and transmission image of the specimen 23 are simultaneously obtained.

Since the third embodiment adopts the optical path split system 40 for simultaneously or selectively scanning the specimen 23 with the laser beam Q having passed through the optical fiber 3 and the laser beam Qb modulated by the harmonic generation optical system 8, the third embodiment can attain the same effects as those of the first and second embodiments. To obtain the transmission image of a thick specimen 23 such as a brain section at high contrast, a laser beam having a long wavelength which hardly scatters on the specimen 23 is required. The fluorescent image and transmission image of the specimen 23 can be simultaneously or selectively acquired by simultaneously or selectively scanning the specimen 23 with the laser beam Q in a near infrared range having a wavelength of 800 nm and the laser beam Qb in an ultraviolet range having a wavelength of 355 nm, like the third embodiment. In addition, this can be realized by one semiconductor laser source 1.

Note that the present invention is not limited to the first to third embodiments, and can be modified as follows.

For example, the optical path split system 40 can be replaced by an optical system for switching the optical path, e.g., a mirror freely inserted in the optical path, and the shutters 43 and 44 can be omitted.

The optical fiber 3 can be formed from a single-mode type optical fiber to increase the harmonic generation efficiency by the harmonic generator 5.

In the first embodiment, the optical fiber 3 is laid between the collector lens 2 and the harmonic generator 5. Alternatively, the resonator 7 may be arranged on the semiconductor laser source 1 side, and the optical fiber 3 may be laid between the resonator mirror 10 of the resonator 7 and the condenser lens 14 of the harmonic generation optical system.

As has been described in detail above, the present invention can provide a laser scanning microscope which is free from any influence of vibrations and heat from a laser source, does not vary the light quantity of a UV laser beam to a specimen, exhibits stable performance with small size, and has a high optical resolving power.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser scanning microscope for scanning a specimen with a laser beam being passed through an optical fiber, and obtaining an observation image of the specimen on the basis of light from the specimen, comprising:

a laser source for emitting a laser beam having a first wavelength;

an optical fiber for transmitting the laser beam having the first wavelength from said laser source to a microscope main body;

laser modulation means for modulating the laser beam having the first wavelength that has passed through said optical fiber into a laser beam having a second wavelength shorter than the first wavelength; and an optical system for scanning the specimen with the laser beam having the first wavelength that has passed through said optical fiber, and the laser beam having the second wavelength that is modulated by said laser modulation means, simultaneously or selectively.

2. A laser scanning microscope according to claim 1, wherein the laser beam having the second wavelength is an UV (ultraviolet) laser beam.

3. A laser scanning microscope according to claim 1, wherein the laser modulation means is attached to a main body of the laser scanning microscope.

4. A laser scanning microscope for scanning a specimen with a laser beam being passed through an optical fiber, and obtaining an observation image of the specimen on the basis of light from the specimen, comprising:

a laser source for emitting a laser beam having a first wavelength;

an optical fiber for transmitting the laser beam having the first wavelength from said laser source to a microscope main body;

a harmonic generator modulating the laser beam having the first wavelength that has passed through said optical fiber into a laser beam having a second wavelength shorter than the first wavelength; and an optical system for scanning the specimen with the laser beam having the first wavelength that has passed through said optical fiber, and the laser beam having the second wavelength that is modulated by said harmonic generator, simultaneously or selectively.

5. A laser scanning microscope according to claim 4, wherein the laser beam having the second wavelength is an UV (ultraviolet) laser beam.

6. A laser scanning microscope according to claim 4, wherein the harmonic generator is attached to a main body of the laser scanning microscope.

7. A laser scanning microscope according to claim 1, further comprising:

a first detector for detecting the laser beam having the first wavelength, which passes through the specimen; and a second detector for detecting fluorescent light excited by the laser beam having the second wavelength, wherein transparent observation is performed based on output of the first detector and fluorescent light observation is performed based on output of the second detector.

8. A laser scanning microscope according to claim 4, further comprising:

a first detector for detecting the laser beam having the first wavelength, which passes through the specimen; and a second detector for detecting fluorescent light excited by the laser beam having the second wavelength, wherein transparent observation is performed based on output of the first detector and fluorescent light observation is performed based on output of the second detector.

* * * * *